United States Patent [19]

Paulsen

[11] Patent Number: 5,449,330
[45] Date of Patent: Sep. 12, 1995

[54] EPICYCLIC CHANGE-SPEED GEARBOX AUTOMATIC GEAR-CHANGING ARRANGEMENT AND METHOD

[75] Inventor: Lutz Paulsen, Esslingen, Germany
[73] Assignee: Mercedes-Benz AG, Germany
[21] Appl. No.: 164,932
[22] Filed: Dec. 10, 1993
[30] Foreign Application Priority Data
Dec. 10, 1992 [DE] Germany ............... 42 41 593.4
[51] Int. Cl.⁶ ............................................. F16H 59/18
[52] U.S. Cl. .............................. 477/107; 477/110; 477/156; 477/149; 475/60; 475/125
[58] Field of Search ............... 477/107, 109, 110, 156, 477/143, 148, 149; 364/424.1; 475/125, 60, 123, 127

[56] References Cited

U.S. PATENT DOCUMENTS 5,079,970  1/1992  Butts et al. ..................... 477/110
5,085,105  2/1992  Wakahara et al. ............. 477/148

FOREIGN PATENT DOCUMENTS 2101243  1/1983  United Kingdom .

*Primary Examiner*—Charles A. Marmor
*Assistant Examiner*—Peter Kwon
*Attorney, Agent, or Firm*—Evenson, McKeown, Edwards & Lenahan

[57] ABSTRACT

In an arrangement for automatically changing gear in an epicyclic change-speed gearbox from a previous gear, in which a first frictional connection (clutch or brake) is engaged, into another gear, in which a second frictional connection is engaged, the working pressure for engaging the first frictional connection is switched off when the working pressure for engaging the second frictional connection reaches a significant pressure value. The pressure value is determined by comparison with a reference parameter which depends on the load torque.

10 Claims, 2 Drawing Sheets

EPICYCLIC CHANGE-SPEED GEARBOX AUTOMATIC GEAR-CHANGING ARRANGEMENT AND METHOD

BACKGROUND AND SUMMARY OF THE INVENTION

The present invention relates to a method and arrangement for automatic gear-changing of a motor vehicle epicyclic change-speed gearbox from a previous gear, in which a first frictional connection is engaged by an associated pressure-medium gear-change actuator, into a new gear, in which a second frictional connection is engaged by an associated pressure-medium gear-change actuator and the first frictional connection is disengaged by switching off working pressure of the associated gear-change actuator, comprising means for measuring working pressure of a gear-change actuator of the new gear. The working pressure of the gear-change actuator of the previous gear is switched off when the working pressure of the gear-change actuator of the new gear reaches or exceeds a significant pressure value determined by comparison with a reference parameter.

In a known automatic gear-changing arrangement as seen in, for example, DE 38 41 304 A1, the working pressure of the gear-change actuator of third gear is fed, during a change from the second gear to the third gear, by an overlap control valve to a control pressure surface of a gear-change spool which controls the admission of working pressure to the gear-change actuator of the second gear. For this purpose, the gear-change spool and a second control pressure surface which, however, acts in the opposite direction and to which control pressure is admitted by an electromagnetic control valve when the gear-change spool is changed into its position for the second gear.

During this known procedure, the significant pressure value of the working pressure of the gear-change actuator of third gear is determined by the constant value of the control pressure and by the area ratio of the control pressure surfaces on the gear-change spool of the third gear. When the gear is changed back from third gear to second gear, another associated overlap control valve is actuated by feeding the working pressure of the gear-change actuator of the second gear to a control pressure surface of the overlap valve and by the resulting control pressure force being balanced by a spring force. In this arrangement, therefore, the significant pressure value of the working pressure of the gear-change actuator of the second gear, which leads to the switching off of the working pressure of the gear-change actuator of the third gear, is determined by a valve spring, i.e. again by a fixed reference parameter in the form of a design constant, as in the case of changing up.

A hydraulic pressure control system for an automatic gearbox with a torque converter is described in DE 39 36 115 A1. This known system operates with a multi-stage transmission gear with a plurality of gear wheel stages and friction elements for selecting power transmission paths within the gearbox, a hydraulic control device for controlling the engagement and separation of the friction elements in order to produce one of the gear stages, control apparatus for controlling the conduit pressure of the hydraulic control device as a function of vehicle operating conditions, an engine torque monitoring device for determining an engine driving torque, a monitoring device for determining a turbine rotational speed of the torque converter, and a gear-change condition monitor for determining an upward or downward change in the gearbox.

In order effectively to suppress a torque jolt during a gear change and to create a control of a conduit pressure as a function of an engine operating condition when changing the gear up or down, this known control system operates such that the conduit pressure control apparatus controls the conduit pressure as a function of at least the engine torque, when changing up, and of at least the turbine speed, when changing down. A hydraulic system pressure controlled by various parameters is regulated by a pulse valve when changing up. The pressure level, in addition to further devices, is intended to ensure that during gear changes, while the frictional element to be switched off has still not become unpressurized, the stress in the gearbox is kept within low limits. The actual time of changing up and down of the previous and new gear is exclusively determined by the time when magnetic valves, which control the switching valves setting the system pressure for the gear-change actuators of the frictional device, are actuated without the attainment of a reference pressure value being used as the switch-off criterion for the previous gear.

A method for gear-change control in an automatic gearbox which is drive connected to a drive machine with a load control element is also described in DE 41 14 383 A1. The automatic gearbox contains a predetermined rotational element, a disengaging element and an engaging element. So that a time at which an element being disengaged has to be released can be determined easily and rapidly, this known method includes the steps of initiating an engagement procedure of the engaging elements; recording a rotational speed of the predetermined rotational element and generating a rotational speed display signal which displays the recorded rotational speed; determining a differential coefficient with respect to time of the rotational speed display signal and generating a derived display signal which provides the differential coefficient determined; and releasing the disengaging element in reaction to the derived signal.

With this last-described known method, an attempt is made to determine the optimum switch-off time from the differential coefficient of the gearbox input rotational speed or angular speed with respect to time, with the derivative being calculated at equidistant time intervals. It is apparent, however, that changes to the angular speed can only occur when the engaging frictional element has already led to a retardation of the rotational speed and therefore to the travelling speed and, therefore, this signal always comes too late.

In contrast thereto, an object on which the present invention is based consists essentially in being able to switch off, during a gear change, the gear-change actuator of the previous gear, while also taking account of gear-changing comfort and the service life of the gear-changing apparatus involved. Gear-changing comfort can be impaired by the gear-changing jolt which may occur, and the service life can be shortened by excessively long sliding times of the rubbing surfaces.

The foregoing object has been achieved in an advantageous manner in accordance with the present invention, by providing a method and arrangement in which the reference parameter is varied as a function of a drive engine load torque and, to the extent necessary (i.e. the appropriate extent), a conversion ratio of a hydrodynamic torque converter is utilized, and the significant pressure value is associated with an instantaneous value of transmittable torque of the frictional connection of the new gear corresponding to an instantaneous actual value of the load torque.

In the arrangement and method for the automatic gear-changing of the change-speed gearbox in accordance with the present invention, a reference signal, which changes in a corresponding manner, is formed by processing operating parameters of the drive engine and, if necessary, of a hydrodynamic torque converter fitted downstream in the force path. On the basis of the load torque present, this reference signal determines the torque which has to be instantaneously transmitted by the frictional connection of the new gear. When the working pressure of the associated gear-change actuator reaches or exceeds the pressure value corresponding to this torque which has to be transmitted, the working pressure of the gear-change actuator of the previous gear is switched off.

The present invention also includes advantageous circuit and control technology, as well as gear-changing of the change-speed gearbox in which a first frictional connection is disengaged and a second frictional connection is engaged.

For a counter-rotating gear-change of the change-speed gearbox in which the second frictional connection is disengaged and the first frictional connection is engaged, the present invention also includes control measures and apparatus for switching off the working pressure at the first frictional connection as is the case for the switching off of the working pressure at the second frictional connection.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
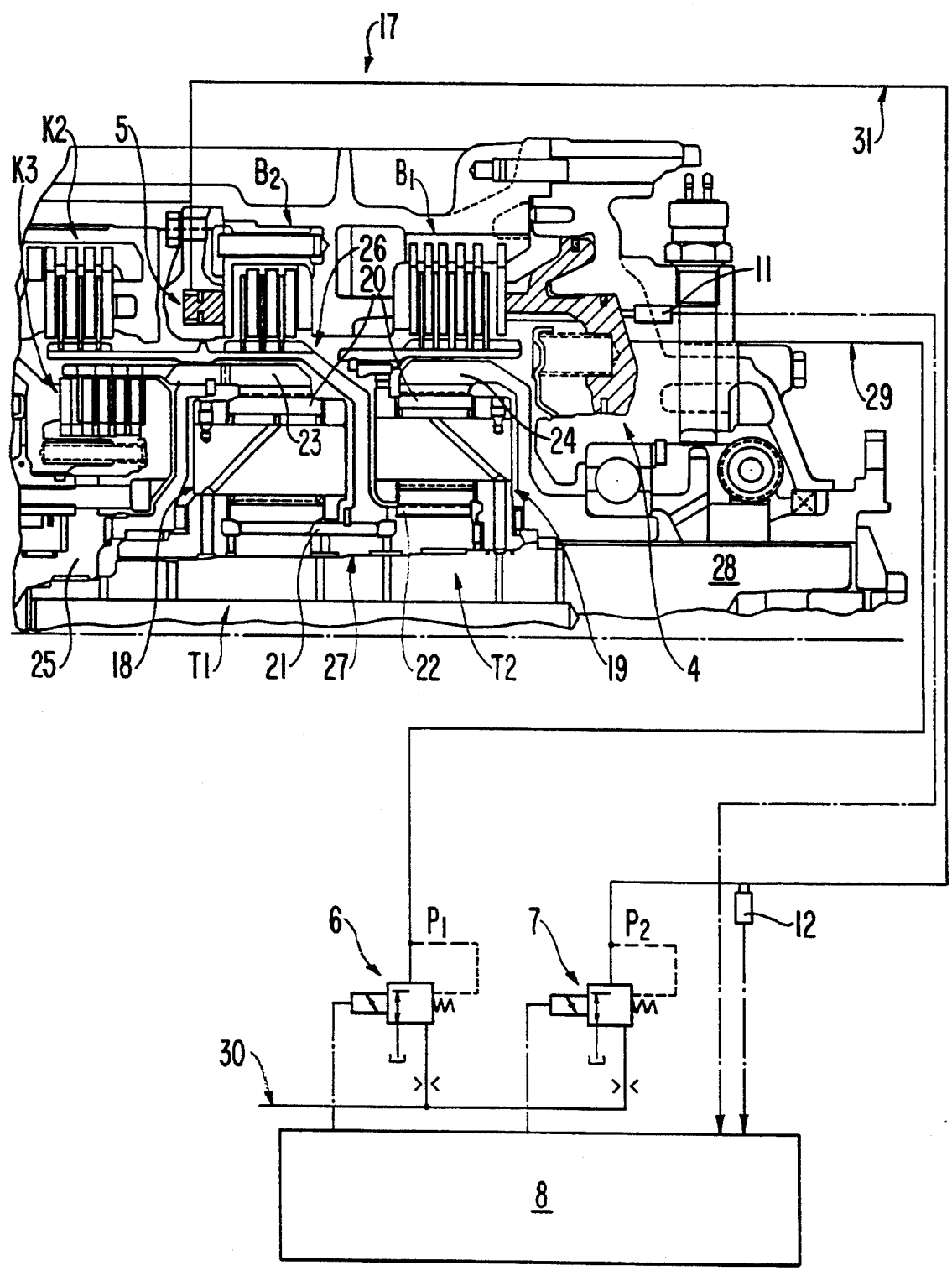
FIG. 1 is a partial cross-sectional view of a change-speed gearbox with an arrangement for gear-changing between the first gear and the second gear in accordance with the present invention, and containing a center line connected into a block circuit diagram.

Referring first to FIG. 1, a change-speed gearbox 17 has two epicyclic gear trains T1 and T2 in which, in each case, at least one planet wheel 20 supported on a planet carrier 18 or 19 is in engagement both with a sun wheel 21 or 22, respectively, and with a concentric outer wheel 23 or 24, respectively. An input shaft 25 which can be driven by a drive engine via a hydrodynamic torque converter is connected to the concentric outer wheel 23 of the gear train T1 by a first drive clutch K3 and is connected to a drive drum 26 by a second drive clutch K2. The drive drum 26 is, in turn, connected to a coupling shaft 27 which is configured in one part with the two sun wheels 21 and 22. The coupling shaft 27 can be brought to rest in second gear by a multiple-disc brake B2 connected to the drive drum 26, with the drive clutch K3 being still engaged in second gear. Whereas an output shaft 28 coaxial with the input shaft 25 is connected both to the planet carrier 18 of the gear train T1 and to the outer concentric wheel 24 of the gear train T2, the planet carrier 19 of the gear train T2 can be brought to rest in first gear by a multiple-disc brake B1, with the drive clutch K3 being likewise still engaged in first gear.

The multiple-disc brake B1 is engaged by a pressure-medium gear-change actuator 4 of the axial piston type whose working pressure chamber, displaceably accommodating the axial piston in a conventional manner, is connected by a working pressure conduit 29 to an electromagnetic pressure control valve 6 which can be actuated by an electronic control unit 8. The working pressure p1 in the working pressure chamber is recorded by a pressure sensor 11 connected to the pressure chamber and its signal output 11.1 (FIG. 2) is connected to an input of the control unit 8. The pressure control valve 6 is connected via an orifice to a main pressure conduit 30 which carries a main pressure which is controlled as a function of the engine load.

The multiple-disc brake B2 is engaged by a pressure-medium gear-change actuator 5 of the axial piston type, whose working pressure chamber displaceably accommodating the working piston in the conventional manner is connected by a working pressure conduit 31 to an electromagnetic pressure control valve 7 which is likewise fed from the main pressure conduit 30 via an orifice and is be actuated by the control unit 8. The working pressure p2 of the gear-change actuator 5 is recorded by a pressure sensor 12 which is connected to the working pressure conduit 31 and whose signal output 12.1 (FIG. 2) is connected to an input of the control unit 8.

Figure 2:
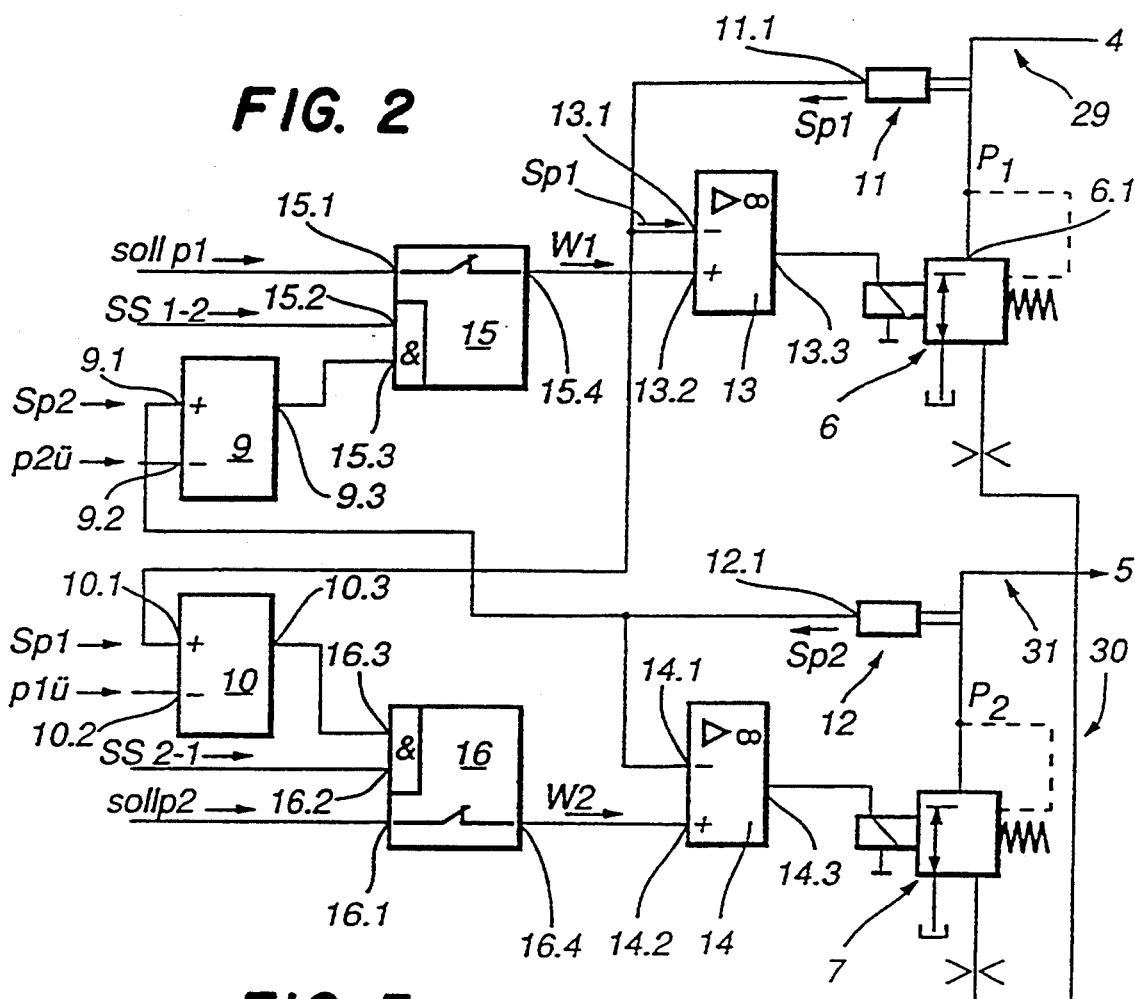
FIG. 2 is a block circuit diagram of a circuit of the electronic control unit of the arrangement of FIG. 1.

FIG. 2 shows an arrangement for switching off the working pressure p1 of the gear-change actuator 4 when the change-speed gearbox 17 is changed from first gear to second gear. In particular, a comparator stage 9 has a first input 9.1 which is connected to the signal output 12.1 of the pressure sensor 12 in order to measure the working pressure p2; the working pressure p2 is admitted to the gear-change actuator 5 to engage the multiple-disc brake B2 in second gear. Consequently, a signal Sp2 proportional to the working pressure p2 appears at the signal output 12.1. A second input 9.2 of the comparator stage 9 can have a reference signal p2ü supplied thereto. This reference signal p2ü is continuously adjusted by the control unit 8 approximately proportionally to the load torque of the input shaft 25 to be transmitted as a function of the operating point of the drive engine, taking account, if necessary, of the conversion ratio of a hydrodynamic torque converter arranged in the force path between the drive engine and the change-speed gearbox. A level change from "0" to "1" appears at the output 9.3 of the comparator stage 9 when the input signal, which depends on the working pressure p2, at the comparator input 9.1 is equal to or larger than the load-dependent input signal p2ü at the comparator input 9.2.

In the non-transient condition of the change-speed gearbox 17, a switch such as an analog switch 15 is in its switched-through position in which a switch input 15.1 is connected to a switch output 15.4. In this switched-through position, the signal W1 occurring at the switch output 15.4 is equal to a signal REQUIRED p1, which is supplied to the switch input 15.1 and which is specified by the control unit 8. The analog switch 15 can be moved, independently of the condition at the switch input 15.1, into a shut-off position in which the signal W1 at the switch output 15.4 is zero.

The control part of the analog switch 15 has two control inputs 15.2 and 15.3 connected together by an AND condition. The control input 15.2 can have a change-up signal SS1-2 supplied to it in order to change the change-speed gearbox 17 from first gear to second gear. The other control input 15.3 is connected to the comparator output 9.3. The analog switch 15 therefore only reaches its shut-off position if the change-up signal SS1-2 is present and if, in addition, the significant pressure value determined by the reference signal p2ü reaches or exceeds the working pressure p2.

The analog switch 15 is connected by an amplifier stage 13 to the pressure control valve 6 for the working pressure p1. This amplifier stage 13 has an input 13.1 to which can be supplied (returned) a signal Sp1 which appears at the signal output 11.1 of the pressure sensor 11 for measuring the working pressure p1 and which is proportional to the working pressure p1. In addition, the amplifier stage 13 has an input 13.2 to which can be supplied the output signal W1 of the analog switch 15. The output 13.3 of the amplifier stage 13 is connected to the magnet part of the pressure control valve 6.

The condition of the gear-change brake B2 in first gear is determined by a signal REQUIRED p2 which, like the signal REQUIRED p1, is calculated by the control unit 8 using parameters of the engine operating point and the driving condition and which is connected to an input 16.1 of a second analog switch 16. The control part of the analog switch 16 has an input 16.2 for a gear-change signal SS2-1 emitted by the control unit 8 for changing back from second gear to first gear and an input 16.3 for the output signal at an output 10.3 of a second comparator stage 10. The two control inputs 16.2 and 16.3 of the analog switch 16 have an AND connection so that the analog switch 16 can only be changed from a switched-through position, in which the switch input 16.1 for the signal REQUIRED p2 is connected to a switch output 16.4 for an output signal W2 and consequently, W2=REQUIRED p2, into a shut-off position in which the output signal W2=0, if the signal level is changed from "0" to "1" at both control inputs 16.2 and 16.3, i.e. when the gear-change signal SS2-1 is present and the signal Sp1, which is proportional to the working pressure p1, of the pressure sensor 11 at one input 10.1 of the comparator stage 10 is equal to or greater than a comparison signal p1ü at the other input 10.2 of the comparator stage 10.

The comparison signal p1ü is continuously adjusted by the control unit 8, approximately proportionally to the load torque transmitted by the input shaft 25 of the change-speed gearbox 17, using parameters of the engine operating point and, if necessary, taking account of the conversion ratio of a hydrodynamic torque converter. The output 16.4 of the analog switch 16 is connected to an input 14.2 of an amplifier stage 14 whose output 14.3 is connected to the magnet part of the control pressure valve 7. The other input 14.1 of the amplifier stage 14 is connected to the signal output 12.1 of the pressure sensor 12 in order to measure the working pressure p2 to be admitted to the change-speed actuator 5.

Figure 3:
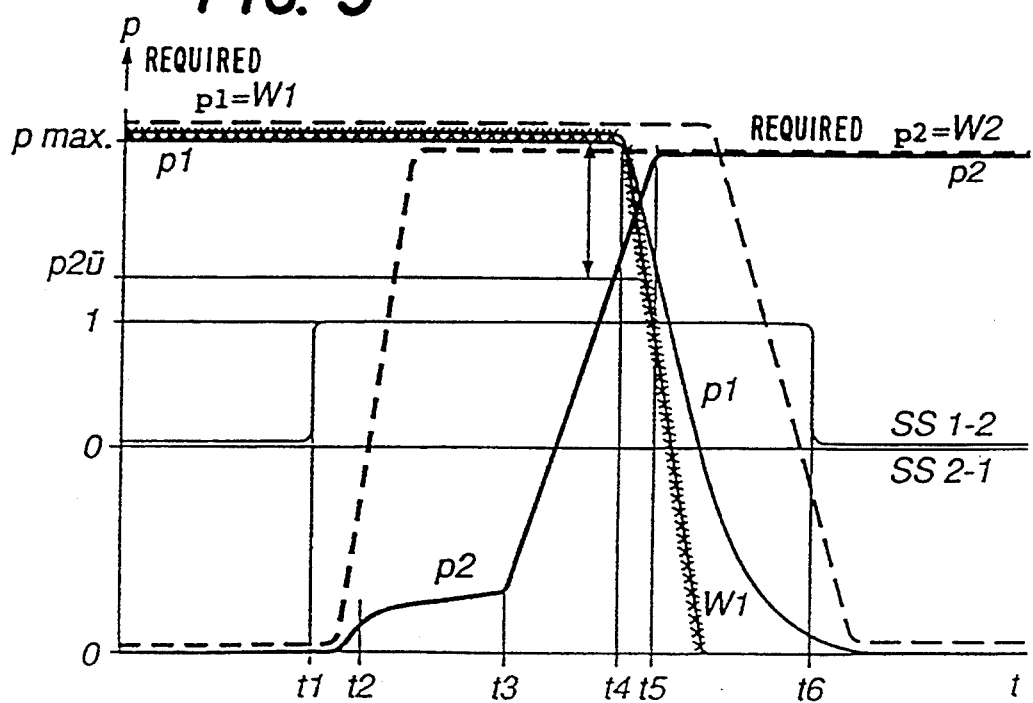
FIG. 3 is a graph of a gear-change from the first gear to the second gear in the arrangement of FIGS. 1 and 2, in which the respective pressure curve and the respective signal condition are plotted against time.

As shown in FIG. 3, the signals REQUIRED p2 and W2 are respectively equal to zero in the non-transient condition t<t1 of the first gear so that the working pressure p2 is switched off, whereas REQUIRED p1=W1 so that the working pressure p1 is set to its pressure value p1max corresponding to the transmission of the maximum torque.

The gear-change signal SS1-2 appears at the time t1 and, at the same time, the signal REQUIRED p2=W2 is set, starting from 0, to the value p2max for the transmission of the maximum torque so that, after a delay period, the filling phase t2-t3 begins at the time t2 whereas the gear-change actuator 5 of the gear brake B2 is filled with pressure medium while removing the release clearance and the working pressure p2 only increases insubstantially or remains constant. When the filling phase t2-t3 at the gear-change actuator 5 has ended, the working pressure p2 increases and, at the time t4, reaches the significant pressure value p2ü so that a level change from "0" to "1" also appears at the second control input 15.3 of the analog switch 15 and the control signal W1 at the switch output 15.4 is set to 0. Consequently, the working pressure p1 is switched off because the gear-change brake B2 can now support by itself the instantaneous torque which is associated with the load torque of the input shaft 25. At the time t5, the working pressure p2 has reached the value p2max necessary for the transmission of the maximum torque so that the change-speed gearbox 17 is now in the non-transient condition of the second gear and, for this reason, the gear-change signal SS1-2 can again be set to 0 at the time t6, preferably when the working pressure p1 has completely fallen to 0 after a certain delay period.

When changing back from second gear into first gear, the arrangement for switching off the working pressure p2 at the same time as the working pressure p1 reaches the significant pressure value p1ü is made in precisely the same way as switching off the working pressure p1, as previously described. That is, the analog switch 16 is changed into its shut-off position which sets the control signal W2 to 0 if the signal level is set to "1" at both control inputs 16.2 and 16.3. This occurs when the signal Sp1, which is proportional to the working pressure p1, at the comparator input 10.1 is equal to or larger than the comparison signal p1ü at the comparator input 10.2 and, as a result, the signal level is set to "1" at the comparator output.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An arrangement for automatic gear-changing of a motor vehicle epicyclic change-speed gearbox from a previous gear, in which a first frictional connection is engaged by an associated pressure-medium gear-change actuator, into a new gear, in which a second frictional connection is engaged by an associated pressure-medium gear-change actuator and the first frictional connection is disengaged by switching off working pressure of the associated gear-change actuator, comprising means for measuring working pressure of a gear-change actuator of the new gear and the working pressure of the gear-change actuator of the previous gear is switched off when the working pressure of the gear-change actuator of the new gear reaches or exceeds a pressure value determined by comparison with a reference parameter, and means for varying the referparameter as a function of a drive engine load torque and, to an appropriate extent, utilizing a conversion ratio of a hydrodynamic torque converter and the determined pressure value with an instantaneous value of transmittable torque of the frictional connection of the new gear corresponding to an instantaneous actual value of the load torque.

2. The arrangement according to claim 1, wherein a comparator stage is supplied with input signals for the reference parameter and the working pressure of the gear-change actuator of the new gear, a switching stage is controllable by the comparator stage, and a switching valve is operatively connected to the first gear-change actuator of the previous gear so as to be brought into a position for switching off the working pressure as a function of the switching stage.

3. The arrangement according to claim 2, wherein the switching stage is configured so as only to be brought into a position for switching off the working pressure of the gear-change actuator of the previous gear independently of the comparator stage when a gear-change signal is present for changing the gear of the change-speed gearbox.

4. The arrangement according to claim 3, wherein the switching stage comprises an analog AND switch with two control inputs in which one of the two control inputs is connected to the comparator stage and the gear-change signal is suppliable to the other of the two control inputs.

5. The arrangement according to claim 2, wherein the switching valve comprises an electromagnetic pressure control valve.

6. The arrangement according to claim 2, wherein an amplifier stage with feedback of a signal dependent on the working pressure admitted to the gear-change actuator is operatively connected between the switching stage and the switching valve.

7. The arrangement according to claim 6, wherein a controller output, of the switching valve is operatively connected to a pressure sensor whose output signal is an input to the amplifier stage.

8. The arrangement according to claim 2, wherein a pressure sensor operatively connected to the gear-change actuator of the new gear has an output signal which is input to the comparator stage.

9. The arrangement according to claim 1, wherein, for a gear change from the new gear in which the second frictional connection is engaged into the previous gear in which the first frictional connection is engaged, the working pressure of the gear-change actuator of the new gear is switched off when the working pressure of the gear-change actuator of the previous gear into which the arrangement is shifting again reaches or exceeds the determined pressure value.

10. A method for automatic gear-changing of a motor vehicle epicyclic change-speed gearbox from one gear in which a first frictional connection is engaged by one actuator into a second gear in which a second frictional connection is engaged by another actuator, comprising the steps of measuring working pressure of the another actuator, switching off working pressure of the one actuator when the working pressure of the another actuator at least reaches a pressure value determined by comparison with a reference value, varying the reference value as a function of at least one of drive engine load torque and a conversion ratio of a hydrodynamic torque converter, and associating the determined pressure value with an instantaneous value of transmittable torque of the second frictional connection corresponding to an instantaneous actual value of the drive engine load torque.

* * * * *